US012742678B2

(12) United States Patent
Kueny

(10) Patent No.: US 12,742,678 B2
(45) Date of Patent: Sep. 22, 2026

(54) VERY HIGH RESOLUTION SPECTROMETER FOR MONITORING OF SEMICONDUCTOR PROCESSES

(71) Applicant: Verity Instruments, Inc., Carrollton, TX (US)

(72) Inventor: Andrew Weeks Kueny, Carrollton, TX (US)

(73) Assignee: Verity Instruments, Inc., Carrollton, TX (US)

(*) Notice: Subject to any disclaimer, the term of this patent is extended or adjusted under 35 U.S.C. 154(b) by 21 days.

(21) Appl. No.: 18/352,091

(22) Filed: Jul. 13, 2023

(65) Prior Publication Data

US 2024/0019302 A1 Jan. 18, 2024

Related U.S. Application Data

(60) Provisional application No. 63/389,542, filed on Jul. 15, 2022.

(51) Int. Cl.

*G01J 3/02* (2006.01)
*G01J 3/12* (2006.01)
*G01J 3/26* (2006.01)

(52) U.S. Cl.

CPC ............... *G01J 3/0208* (2013.01); *G01J 3/12* (2013.01); *G01J 3/26* (2013.01); *G01J 2003/1204* (2013.01); *G01J 2003/1213* (2013.01)

(58) Field of Classification Search

CPC .... G01J 3/0208; G01J 3/12; G01J 3/26; G01J 3/0227; G01J 3/18; G01J 3/0218;

(Continued)

(56) References Cited

U.S. PATENT DOCUMENTS 6,381,008 B1 * 4/2002 Branagh ................ G01J 3/443 700/121
7,049,156 B2 5/2006 Kueny (Continued)

FOREIGN PATENT DOCUMENTS

GB 2618846 A * 11/2023 ............ G01N 21/65
JP S52104140 A 9/1977

(Continued)

OTHER PUBLICATIONS

Chamness, in view of Fazekas, PÃⒸter, et al. "Optical emission spectra analysis of thermal plasma treatment of poly (vinyl chloride)." Open Chemistry 13.1 (2015): (Year: 2015).*

(Continued)

*Primary Examiner* — Kara E. Geisel
*Assistant Examiner* — Carlos Perez-Guzman

(57) ABSTRACT

An optical instrument of very high resolution is provided that can be used for monitoring semiconductor processes. Very high resolution may be considered in this application space to be resolutions sufficient to permit resolving of individual molecular rovibrational emission lines. In one example an optical instrument is provided that includes: (1) an optical interface that receives an optical fiber, (2) a narrow band pass filter that filters out a portion of an optical signal received via the optical fiber, (3) optical components that are selectively combined to process at least a portion of the unfiltered optical signal, wherein the optical components include a sensor that receives the unfiltered optical signal, and (4) one or more processors that process electrical signals from the sensor. The optical instrument can be a spectrometer suitable for a process control instrument.

22 Claims, 7 Drawing Sheets

(58) Field of Classification Search
CPC ........ G01J 3/28; G01J 3/04; G01J 2003/1204; G01J 2003/1213; G01N 21/31; H01L 21/67253
See application file for complete search history.

(56) References Cited

U.S. PATENT DOCUMENTS

| | | | | |
|---|---|---|---|---|
| 2005/0060103 | A1* | 3/2005 | Chamness | H01L 21/67253 702/30 |
| 2009/0316159 | A1* | 12/2009 | Scott | G01J 3/024 356/454 |
| 2015/0208957 | A1* | 7/2015 | Zhang | A61B 5/1455 600/479 |
| 2015/0371882 | A1* | 12/2015 | Tsai | C23C 16/52 118/712 |
| 2020/0373210 | A1* | 11/2020 | Chen | G06T 7/0004 |
| 2021/0148756 | A1* | 5/2021 | Bouchard | G01J 3/0291 |
| 2021/0310956 | A1 | 10/2021 | Alizadeh et al. | |
| 2024/0019675 | A1* | 1/2024 | Dennis | G02B 21/36 |
| 2025/0198847 | A1* | 6/2025 | Verdoold | G01N 21/65 |

FOREIGN PATENT DOCUMENTS

| | | | |
|---|---|---|---|
| JP | 2005504980 | A | 2/2005 |
| JP | 2010197224 | A | 9/2010 |
| JP | 2011237374 | A | 11/2011 |
| KR | 20110022099 | A | 3/2011 |
| KR | 20110125603 | A | 11/2011 |
| KR | 20120112238 | A | 10/2012 |

OTHER PUBLICATIONS

Austin, et al; "Broadband astigmatism-free Czerny-Turner imaging spectrometer using spherical mirrors"; Clarendon Laboratory, University of Oxford; Aug. 2009; Optical Society of America; 23 pages.

* cited by examiner

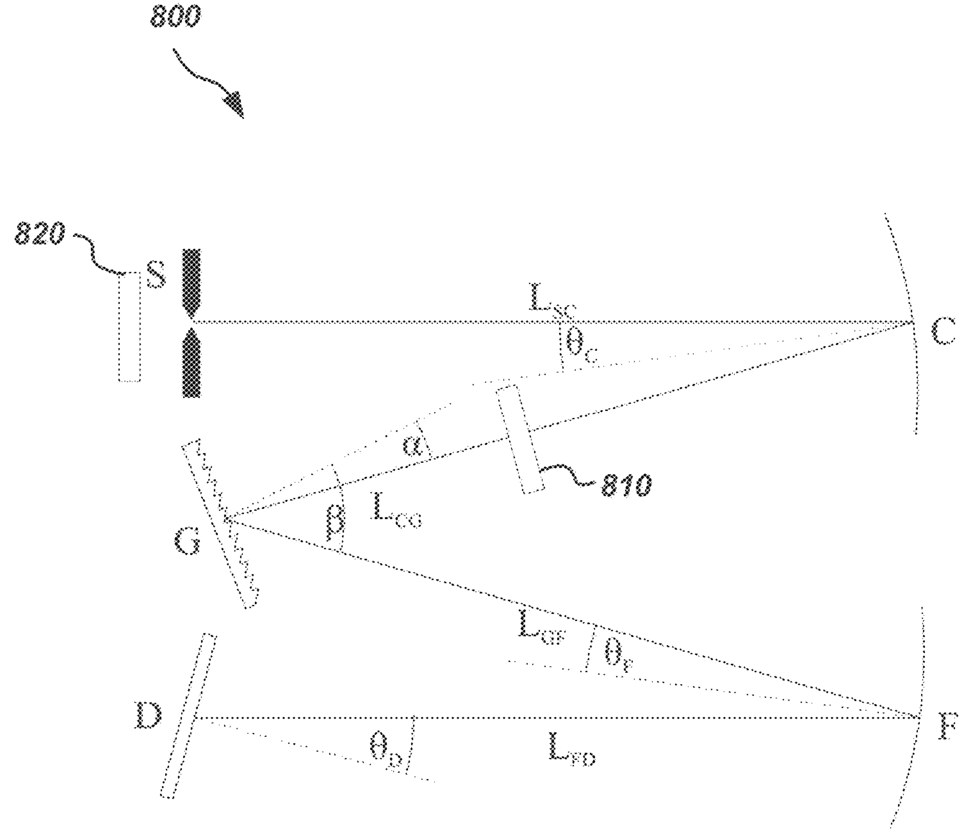

- Entrance slit S, slit to collimating mirror length $L_{SC}$,
- Spherical collimating mirror C with angle of incidence in tangential plane $\theta_C$ and radius $R_C$,
- Collimating mirror to grating distance $L_{CG}$,
- Grating G with angles of incidence $\alpha$ and diffraction $\beta$,
- Grating to focusing mirror distance $L_{GF}$,
- Spherical focusing mirror F with angle of incidence in tangential plane $\theta_F$ and radius $R_F$,
- Focusing mirror to detector distance $L_{FD}$,
- Detector D angled $\theta_D$ to beam.

FIG. 8

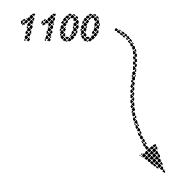
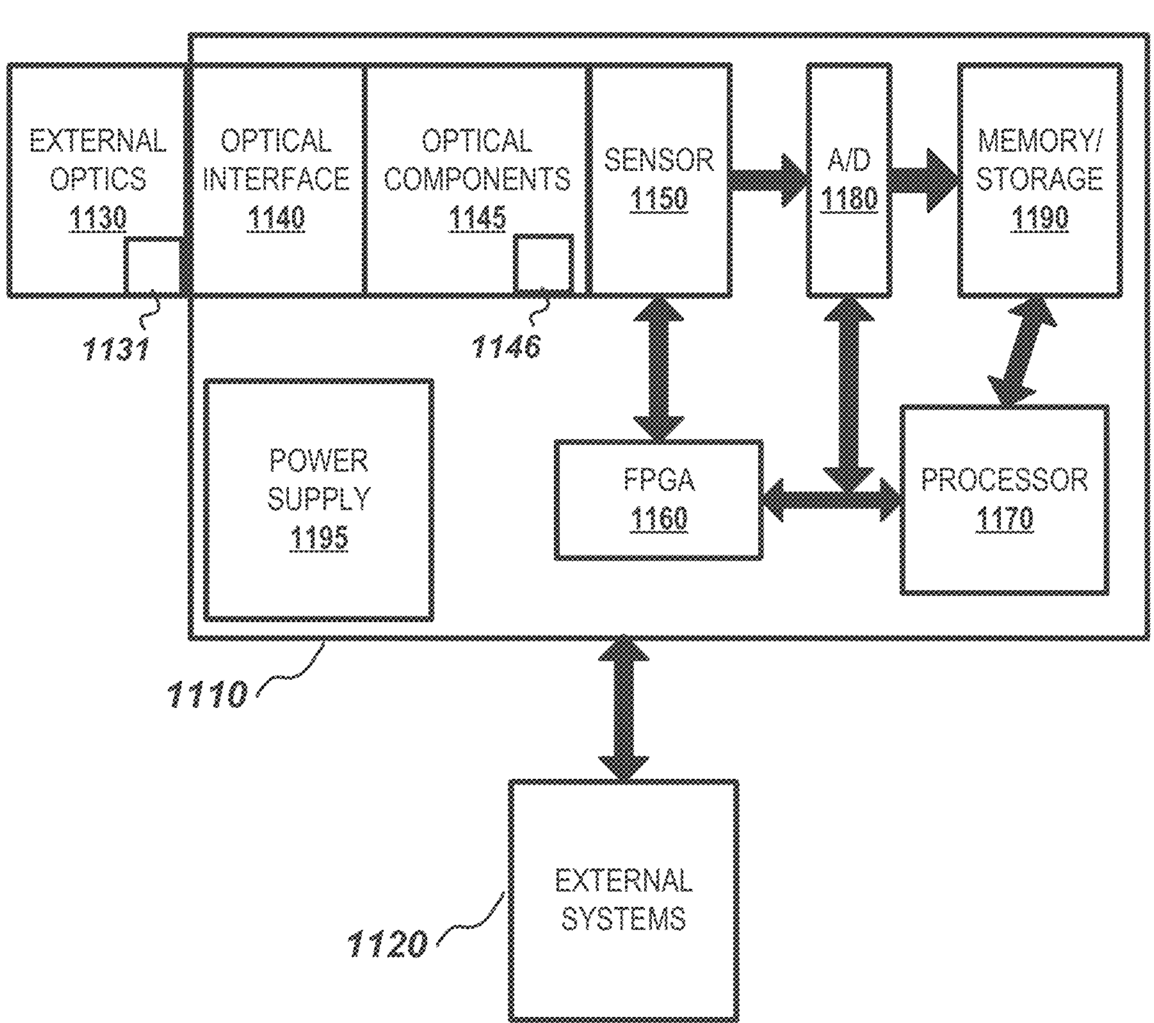
FIG. 11

VERY HIGH RESOLUTION SPECTROMETER FOR MONITORING OF SEMICONDUCTOR PROCESSES

CROSS-REFERENCE TO RELATED APPLICATION

This application claims the benefit of U.S. Provisional Application Ser. No. 63/389,542, filed by Andrew Weeks Kueny on Jul. 15, 2022, entitled "Very High Resolution Spectrometer for Monitoring of Semiconductor Processes", which is commonly assigned with this application and incorporated herein by reference in its entirety.

TECHNICAL FIELD

This disclosure relates, generally, to optical spectroscopy systems and methods of use, and more specifically, to compact very high resolution spectrometers for monitoring of optical emissions from semiconductor processes.

BACKGROUND

Optical monitoring of semiconductor processes is a well-established method for controlling processes such as etch, deposition, chemical mechanical polishing and implantation. Optical emission spectroscopy (OES) and interferometric endpoint (IEP) are two basic types of modes of operation for data collection. In OES applications light emitted from the process, typically from plasmas, is collected and analyzed to identify and track changes in atomic and molecular species which are indicative of the state or progression of the process being monitored.

SUMMARY

In one aspect, the method of processing an optical signal is disclosed. In one example the method includes: (1) receiving an optical signal, (2) filtering the optical signal using a narrow pass band filter, and (3) processing the filtered optical signal using a selective combination of optical components based on a desired resolution.

In another aspect, the disclosure provides an optical instrument. In one example the optical instrument includes: (1) an optical interface that receives an optical fiber, (2) a narrow band pass filter that filters out a portion of an optical signal received via the optical fiber, (3) optical components that are selectively combined to process at least a portion of the unfiltered optical signal, wherein the optical components include a sensor that receives the unfiltered optical signal, and (4) one or more processors that process electrical signals from the sensor.

In yet another aspect, the disclosure provides a semiconductor monitoring system. In one example, the system includes: (1) optical fiber and (2) a modified Czerny-Turner spectrometer having at least one narrow pass band filter that filters out a portion of an optical signal received via the optical fiber.

BRIEF DESCRIPTION OF THE DRAWINGS

Reference is now made to the following descriptions taken in conjunction with the accompanying drawings, in which:

FIG. 8 is a schematic diagram of the optical layout of a Czerny-Turner spectrometer;

FIG. 11 is block diagram of a spectrometer and specific related systems, in accordance with this disclosure;

DETAILED DESCRIPTION

Figure 1:
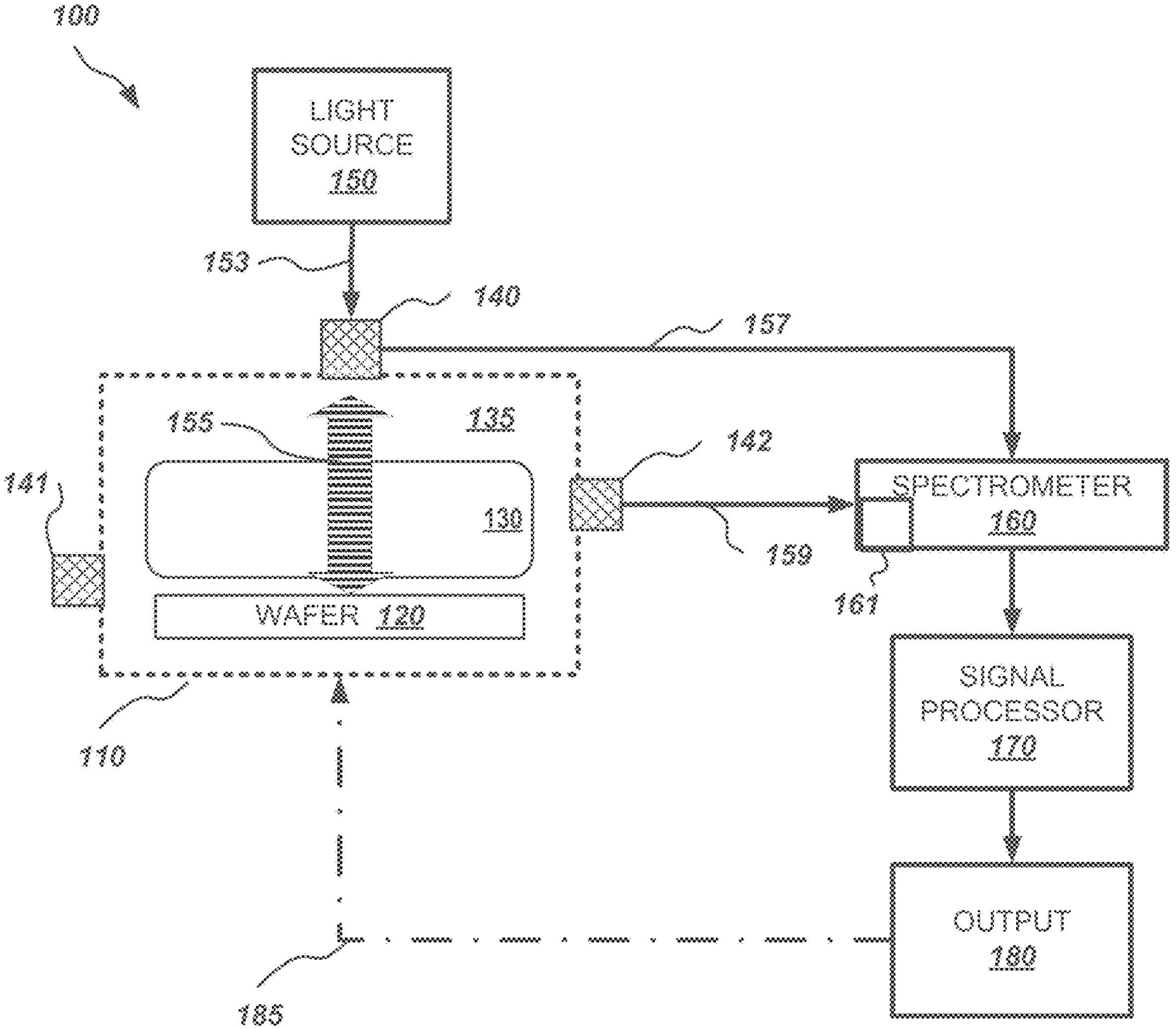
FIG. 1 is a block diagram of a system for employing OES and/or IEP to monitor and/or control the state of a plasma or non-plasma process within a semiconductor process tool.

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals. Other features of the present invention will be apparent from the accompanying drawings and from the following detailed description. It is noted that, for purposes of illustrative clarity, certain elements in the drawings may not be drawn to scale.

The constant advance of semiconductor processes toward faster processes, smaller feature sizes, more complex structures, larger wafer, and more complex process chemistries places great demands on process monitoring technologies. For example, higher data rates are required to accurately monitor much faster etch rates on very thin layers where changes in Angstroms (a few atomic layers) are critical such as for fin field-effect transistor (FINFET) and three dimensional NAND (3D NAND) structures. Wider optical bandwidth, higher resolution, and greater signal-to-noise are required in many cases both for OES and IEP methodologies to aid in detecting small changes either/both for reflectances and optical emissions. Cost and packaging sizes are also under constant pressure as the process equipment becomes more complex and costly itself. All of these requirements seek to advance the performance of optical monitoring of semiconductor processes. Regardless of OES or IEP methodologies, important components of many optical monitoring systems are spectrometers and their ability to consistently and accurately convert received optical data to electrical data for control and monitoring of semiconductor processes.

Growing complexities in process chemistries along with reductions in process open areas are driving advancements in process monitoring systems and most often require improved signal to noise and signal detection capabilities. Although improvements may be provided with better performing electronic components such as A/D convertors, power supplies and higher NEP sensors; the utility of process control information may be inhibited by other factors. One such factor is spectrometer resolution. At existing resolutions, information may provide general trending of semiconductor processing at a very low S/N ratio and may not support robust process controls. Additional information is present in very high resolution spectra where rotational and vibrational emission lines may be isolated for highly specific individual or differential characterization. For example, although a semiconductor plasma process may indicate a small change for a spectral emission when resolved at 1 nm, the same emissions when resolved at much greater resolution will isolate changes in individual rotational and/or vibrational emissions that are more sensitive to plasma, chemical, and concentration changes. Increased resolution may provide insight into the use of fast pulsed plasmas where variable lifetimes and plasma temperature of excited states of species being of particular interest.

Accordingly, the disclosure provides a spectrometer of very high resolution that can be used for monitoring semiconductor processes. Very high resolution may be considered in this application space to be resolutions sufficient to permit resolving of individual molecular rovibrational emission lines. A very high resolution can be within a range of 0.01 to 0.1 nm. A resolution of 0.025 nm is used in at least one example herein as an example of a very high resolution. The disclosure includes at least one implementation of an improved high resolution spectrometer combining a predetermined process specific wavelength range, with very high resolution, and improved out-of-band light rejection to provide a suitable process control instrument.

With specific regard to monitoring and evaluating the state of a semiconductor process within a process tool, FIG. 1 illustrates a block diagram of process system 100 utilizing OES and/or IEP to monitor and/or control the state of a plasma or non-plasma process within a semiconductor process tool 110. Semiconductor process tool 110, or simply process tool 110, generally encloses wafer 120 and possibly process plasma 130 in a typically, partially evacuated volume of a chamber 135 that may include various process gases. Process tool 110 may include one or multiple optical interfaces, or simply interfaces, 140, 141 and 142 to permit observation into the chamber 135 at various locations and orientations. Interfaces 140, 141 and 142 may include multiple types of optical elements such as, but not limited to, optical filters, lenses, windows, apertures, fiber optics, etc.

For IEP applications, light source 150 may be connected with interface 140 directly or via fiber optical cable assembly 153. As shown in this configuration, interface 140 is oriented normal to the surface of wafer 120 and often centered with respect to the same. Light from light source 150 may enter the internal volume of chamber 135 in the form of collimated beam 155. Beam 155 upon reflection from the wafer 120 may again be received by interface 140. In common applications, interface 140 may be an optical collimator. Following receipt by interface 140, the light may be transferred via fiber optic cable assembly 157 to spectrometer 160 for detection and conversion to digital signals. The light can include sourced and detected light and may include, for example, the wavelength range from deep ultraviolet (DUV) to near-infrared (NIR). Wavelengths of interest may be selected from any subrange of the wavelength range. For larger substrates or where understanding of wafer non-uniformity is a concern, additional optical interfaces (not shown in FIG. 1) normally oriented with the wafer 120 may be used. The processing tool 110 can also include additional optical interfaces positioned at different locations for other monitoring options.

For OES applications, interface 142 may be oriented to collect light emissions from plasma 130. Interface 142 may simply be a viewport or may additionally include other optics such as lenses, mirrors and optical wavelength filters. Fiber optic cable assembly 159 may direct any collected light to spectrometer 160 for detection and conversion to digital signals. The spectrometer 160 can include a CCD sensor and convertor for the detection and conversion. Multiple interfaces may be used separately or in parallel to collect OES related optical signals. For example, interface 141 may be located to collect emissions from near the surface of wafer 120 while interface 142 may be located to view the bulk of the plasma 130, as shown in FIG. 1.

In many semiconductor processing applications, it is common to collect both OES and IEP optical signals and this collection provides multiple problems for using spectrometer 160. Typically OES signals are continuous in time whereas IEP signals may be either/both continuous or discrete in time. The mixing of these signals causes numerous difficulties as process control and often requires the detection of small changes in both the OES and IEP signals, and the inherent variation in either signal can mask the observation of the changes in the other signal. It is not advantageous to support multiple spectrometers for each signal type due to, for example, cost, complexity, inconvenience of signal timing synchronization, calibration and packaging.

After detection and conversion of the received optical signals to analog electrical signals by the spectrometer 160, the analog electrical signals are typically amplified and digitized within a subsystem of spectrometer 160, and passed to signal processor 170. Signal processor 170 may be, for example, an industrial PC, PLC or other system, which employs one or more algorithms to produce output 180 such as, for example, an analog or digital control value representing the intensity of a specific wavelength or the ratio of two wavelength bands. Instead of a separate device, signal processor 170 may alternatively be integrated with spectrometer 160. The signal processor 170 may employ an OES algorithm that analyzes emission intensity signals at predetermined wavelength(s) and determines trend parameters that relate to the state of the process and can be used to access that state as in, for instance end point detection, etch depth, etc. For IEP applications, the signal processor 170 may employ an algorithm that analyzes wide-bandwidth portions of spectra to determine a film thickness. For example, see System and Method for In-situ Monitor and Control of Film Thickness and Trench Depth, U.S. Pat. No. 7,049,156, incorporated herein by reference. Output 180 may be transferred to process tool 110 via communication link 185 for monitoring and/or modifying the production process occurring within chamber 135 of the process tool 110.

The shown and described components of FIG. 1 are simplified for expedience and are commonly known. In addition to common functions, the spectrometer 160, the signal processor 170, or a combination of both can also be configured to identify stationary and transient optical and non-optical signals and process these signals according to the methods and/or features disclosed herein. As such, the spectrometer 160 or the signal processor 170 can include algorithms, processing capability, and/or logic to identify and process optical signals and temporal trends extracted therefrom. The algorithms, processing capability, and/or logic can be in the form of hardware, software, firmware, or any combination thereof. The algorithms, processing capability, and/or logic can be within one computing device or can also be distributed over multiple devices, such as the spectrometer 160 and the signal processor 170. The processing can be performed at a very high resolution as disclosed herein to enable processing, for example, emissions of gas species noted below.

Figure 4:
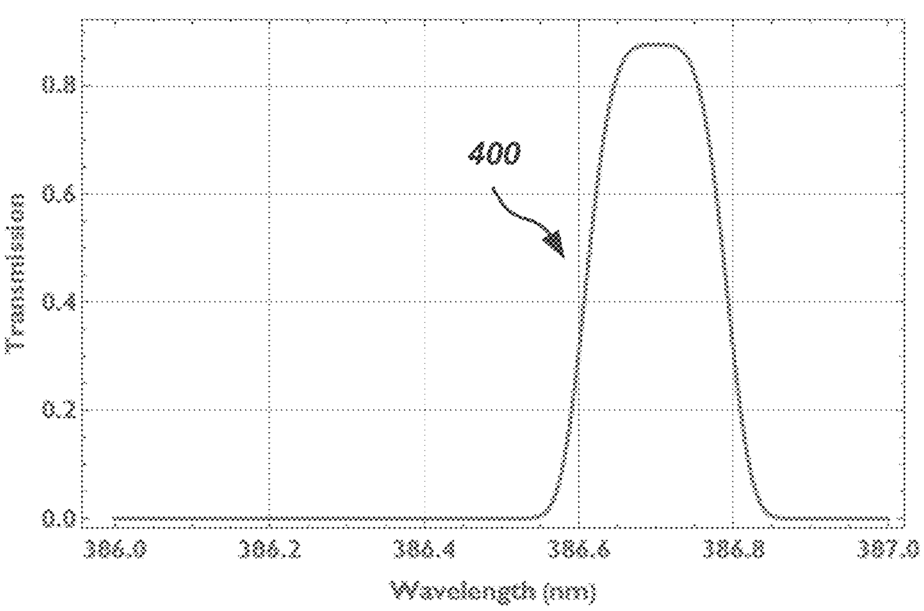
FIG. 4 is a plot of a portion of a transmission spectrum of a bandpass filter centered at about 386.7 nm.

A spectrometer, such as spectrometer 160, has an operational wavelength range, which can be fixed, and one or more filters can be used to select a portion of that range. Filter 161 provides an example of a narrow band filter that can select a portion of the operating range of spectrometer 160. The filter represented in FIG. 4 provides an example of a narrow band filter that can be used. Instead of being internal of the spectrometer like filter 161, a narrow band filter can be external to the spectrometer (such as at least partially outside of a housing of the spectrometer) as represented by filter 1131 in FIG. 11. The narrow band filter can be selected to correspond to the emissions of one or more gas species to be processed.

Various gas species used in semiconductor processing have molecular emissions that contain information that is not readily available when detected by existing process control spectrometers with typical resolutions of 1 nm. Many different molecular species are possible, and include but are not limited to $SiF_x$, CN, $CO_x$, $N_x$, and $NO_x$. Herein examples related to the approximately 387 nm spectral emission of CN will be discussed.

Figure 2:
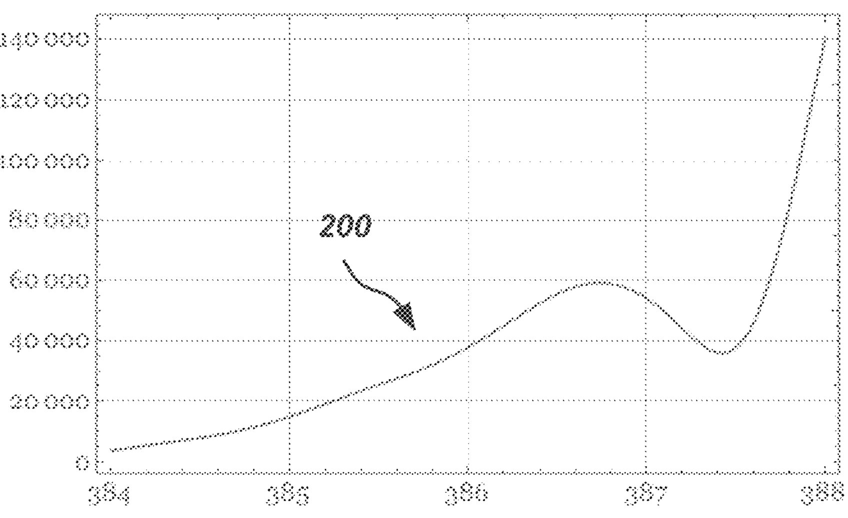
FIG. 2 is a plot of a portion of a spectrum from emission from CN species near 387 nm with typical resolution of approximately 1 nm.
Figure 3:
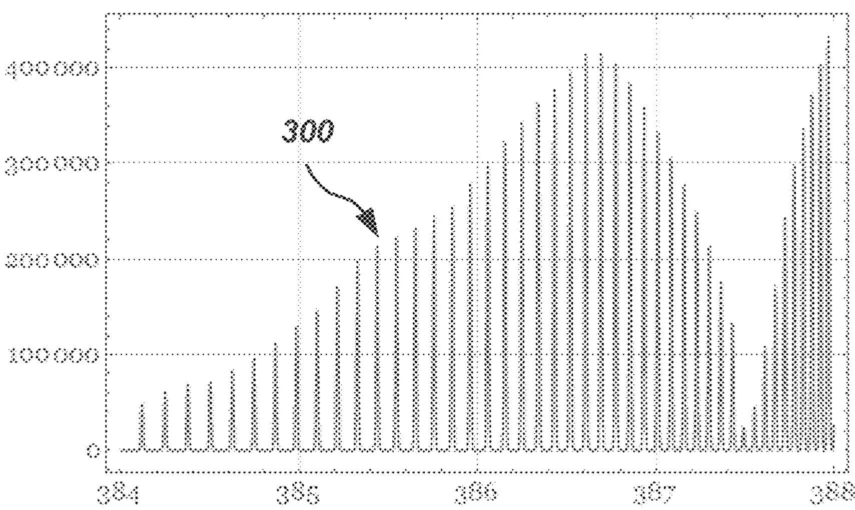
FIG. 3 is a plot of a portion of a spectrum from emission from CN species near 387 nm with typical resolution of approximately 0.023 nm.

FIGS. 2 and 3 show plots of spectra from CN species emission that demonstrates how the resolution used can affect the type and amount of information that is obtained. FIG. 2 shows a plot of a portion of a spectrum 200 from emission from CN species near 387 nm with typical resolution of approximately 1 nm. When compared to FIG. 3, which shows a plot of a portion of a spectrum 300 from emission from CN species near 387 nm with typical resolution of approximately 0.023 nm, it is evident that considerably more information is available for process control in the now individually resolved rotational and vibrational emissions. The plots of FIGS. 2 and 3 have x-axes of wavelength in nanometers and y-axes in arbitrary scales of signal counts.

As seen from the comparison of FIG. 3 to FIG. 2, the resolution used affects the amount of information obtained. Alteration of the resolution of a spectrometer, however, is a non-trivial change and requires modification and/or physical adjustment of most of the primary components of the optical bench. Due to the extreme reliability concerns with semiconductor processing, it is typically not viable to have adjustable components in the optical benches of monitoring systems. Furthermore, while some high resolution spectrometer systems are available, these systems are often very large (dimensions of multiple feet) and therefore not compatible with integration into semiconductor processing equipment.

Figure 5:
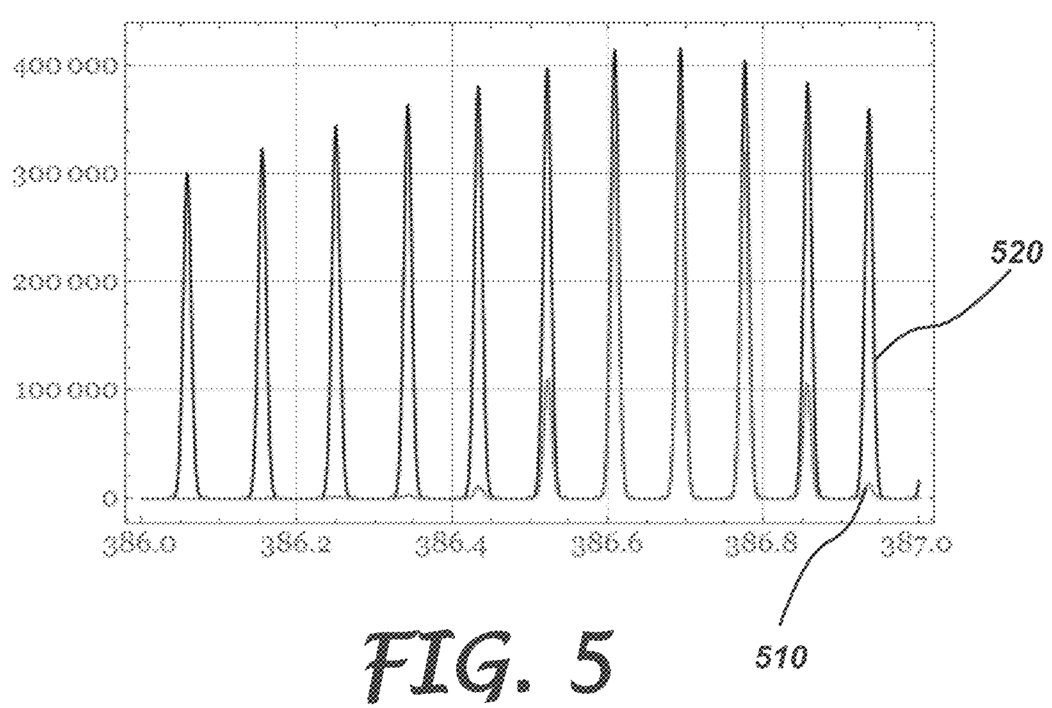
FIG. 5 is a plot of a portion of a spectrum from emission from CN species near 387 nm with typical resolution of approximately 0.023 nm with and without the addition of a bandpass filter centered at about 386.7 nm.
Figure 6:
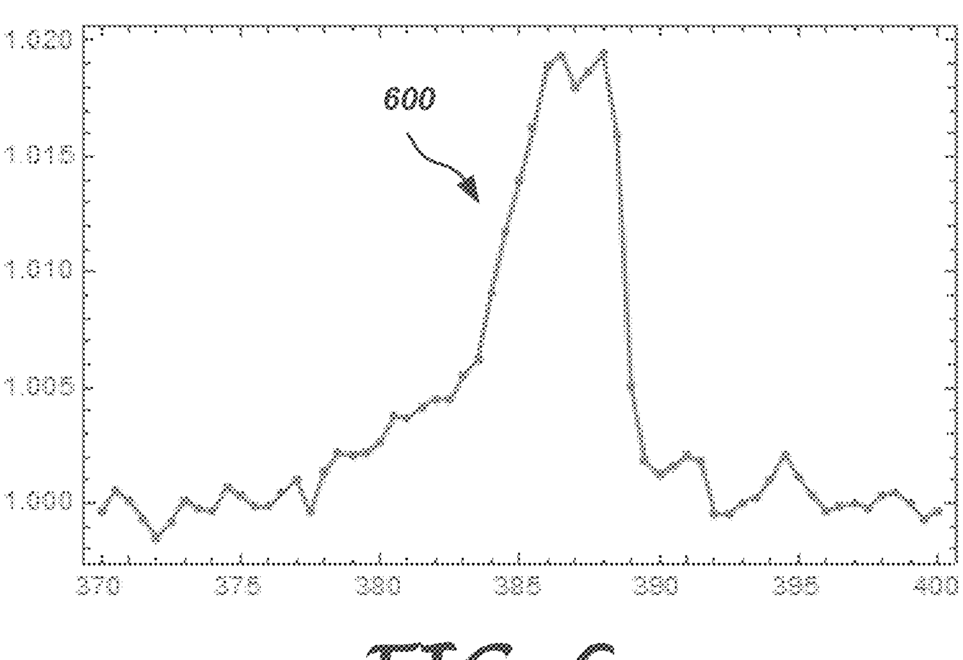
FIG. 6 is a plot of a portion of a spectrum from emission from CN species near 387 nm with typical resolution of approximately 1 nm showing certain signal and noise characteristics.
Figure 7:
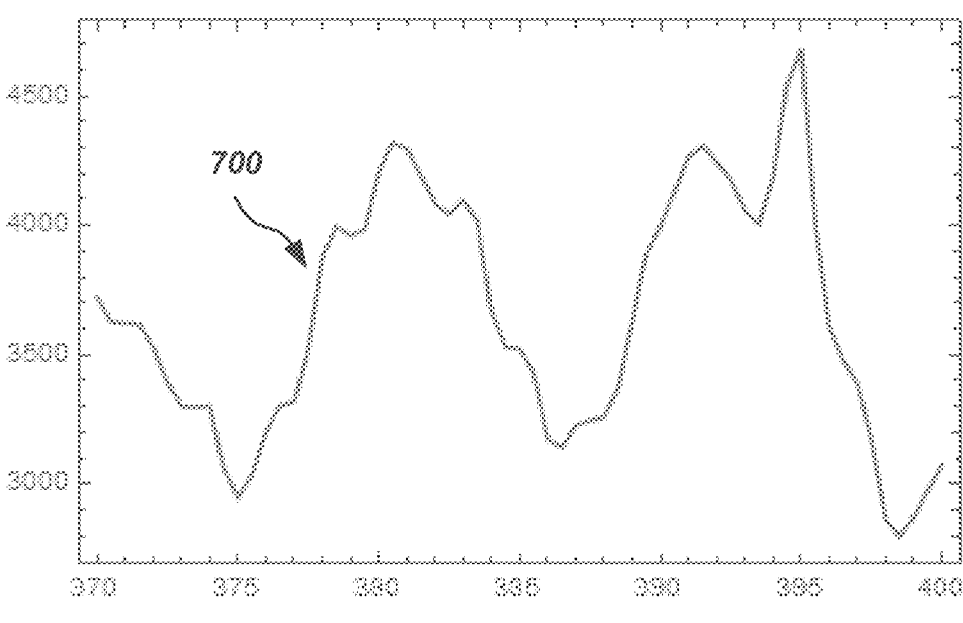
FIG. 7 is a plot of a portion of a spectrum from emission from CN species near 387 nm with typical resolution of approximately 1 nm show degraded signal and noise characteristics due to stray light and other optical contamination.

An additional complication of the monitoring of semiconductor processes is that emissions from such processes can provide very wide band spectral signatures, which if not properly addressed can contribute deleterious stray light and increased noise levels on collected signals. This disclosure describes at least one implementation of an improved high resolution spectrometer combining a predetermined process specific wavelength range, with very high resolution, and improved out-of-band light rejection to provide a suitable process control instrument. FIGS. 4-5 illustrate examples of spectral plots representing the application of a bandpass filter for a specific range combined with very high resolution. FIGS. 6-7 illustrate contrasting examples with considerably lower 1 nm resolution and poor out-of-band light rejection. Comparison of FIGS. 4-7 emphasize the benefits of a high resolution spectrometer as described herein.

FIG. 4 shows a plot of a portion of a transmission spectrum 400 of a bandpass filter centered at about 386.7 nm and shows the out-of-band rejection provided by such a filter. The rejection of such filters may be optical density (OD) 6 or greater and provide strong suppression of undesired signals. FIG. 5 shows a plot of a portion of a spectrum from emission from CN species near 387 nm with typical resolution of approximately 0.023 nm with and without the addition of a bandpass filter centered at about 386.7 nm, such as represented in FIG. 4. In FIG. 5, spectrum 510 is "with" the bandpass filter and spectrum 520 is "without" the bandpass filter. The spectral width of the bandpass filter may constrain the useful wavelength range for collected spectra. For the bandpass filter of FIG. 4 the useful spectral range is approximately 1.0 nm. Other filters may provide wider or narrower useful spectral ranges and may be selected based upon the desired wavelength range for specific species monitoring and process control. Filters may be single band or multiple band filters like comb filters and provide spectral bands appropriate for one or more species. FIG. 5 has an x-axis of wavelength in nanometers and y-axis in arbitrary scales of signal counts.

Benefits of the inclusion of a bandpass filter may be shown by comparison of FIGS. 6 and 7. FIG. 6 shows a plot of a portion of a spectrum 600 from emission from CN species near 387 nm with typical resolution of approximately 1 nm showing certain signal and noise characteristics. If background optical signals are not reduced then the same spectrum may appear as in FIG. 7, which shows spectrum 700 with degraded signal and noise characteristics due to stray light and other optical contamination. FIGS. 6 and 7 have x-axes of wavelength in nanometers. In FIG. 6, the y-axis is normalized signal and FIG. 7 the y-axis is signal counts.

To address the process requirements of appropriately limited spectral range, with useful signal and noise characteristics in a compact package, a Czerny-Turner spectrometer configuration may be used. FIG. 8 shows a general schematic diagram of the optical layout of a Czerny-Turner spectrometer 800 that has been modified according to the principles of the disclosure. The general schematic diagram is referenced from Dane R. Austin, Tobias Witting, and Ian A. Walmsley, "Broadband astigmatism-free Czerny-Turner imaging spectrometer using spherical mirrors," Appl. Opt. 48, 3846-3853 (2009), which is incorporated by reference. In addition to general features of a Czerny-Turner spectrometer as identified in the legend of FIG. 8, the Czerny-Turner spectrometer 800 is customized according to the aspects of this disclosure with the addition of one or more filters represented by the example placements of filter 810 and filter 820. As discussed with respect to FIG. 11, more than one filter can be added for improved processing and more than one type of filter can be used.

A bandpass filter, such as described in FIG. 4, may be located conveniently within the optical path of the Czerny- Turner spectrometer 800. A filter may be located generally at any location between the entrance slit and the detector of the spectrometer. Filter 161 of FIG. 1 represents placement of a filter within a spectrometer. Better filtering performance with a filter within the spectrometer may be achieved by placing a filter in a portion of the collimated light path within the spectrometer 800, such as after mirror C in the optical path as represented by filter 810. A filter, such as represented by filter 820, may be positioned prior to the entrance slit of the spectrometer 800 to block undesired light from entering any portion of the spectrometer 800. Filter 1131 of FIG. 11 represents placement of a filter external to a spectrometer and prior to the entrance slit.

Figure 9:
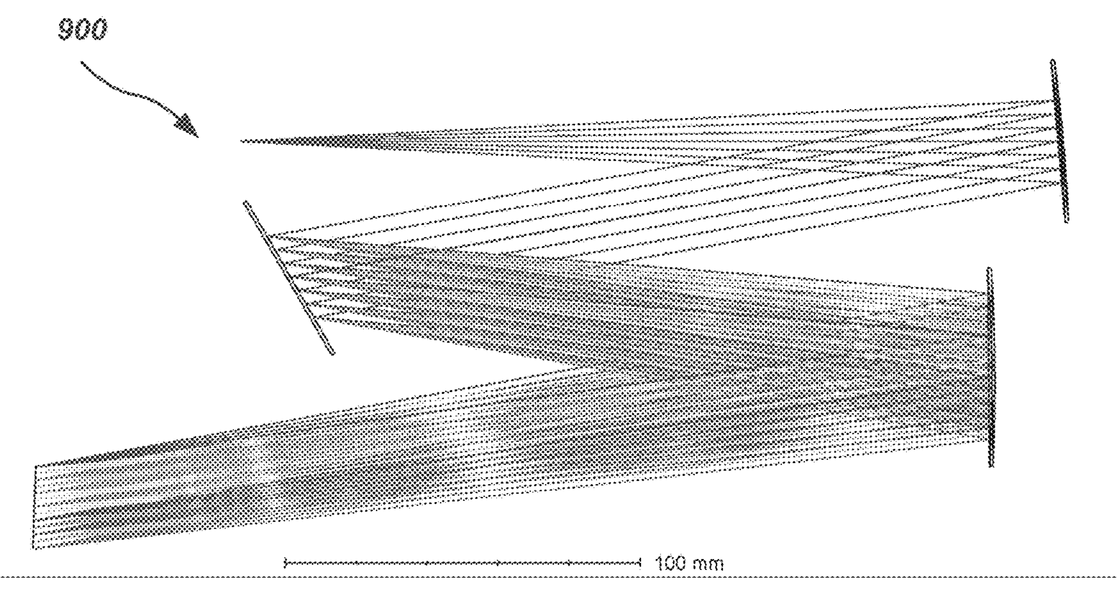
FIG. 9 is an image of ray tracing results on a spectrometer layout, in accordance with this disclosure.

As described herein, the filter used with the Czerny-Turner spectrometer 800, such as filter 810 or 820, can be selected for processing CN 387 nm portion of the optical spectrum or other desired portion of the optical spectrum. FIG. 9 shows an image 900 of ray tracing results of such a spectrometer having a layout optimized for the CN 387 nm portion of the optical spectrum. A slit S, collimating mirror C, grating G, focusing mirror F, and detector D that correspond to the features shown in FIG. 8 are also shown in FIG. 9. The spectrometer modeled by the ray tracing shown in FIG. 9 is capable of spanning a wavelength range of approximately 380-410 nm which is useful for monitoring of emissions from species such as SiN, $SiF_2$, CH, CO and the CN emissions near 387 nm.

Figure 10:
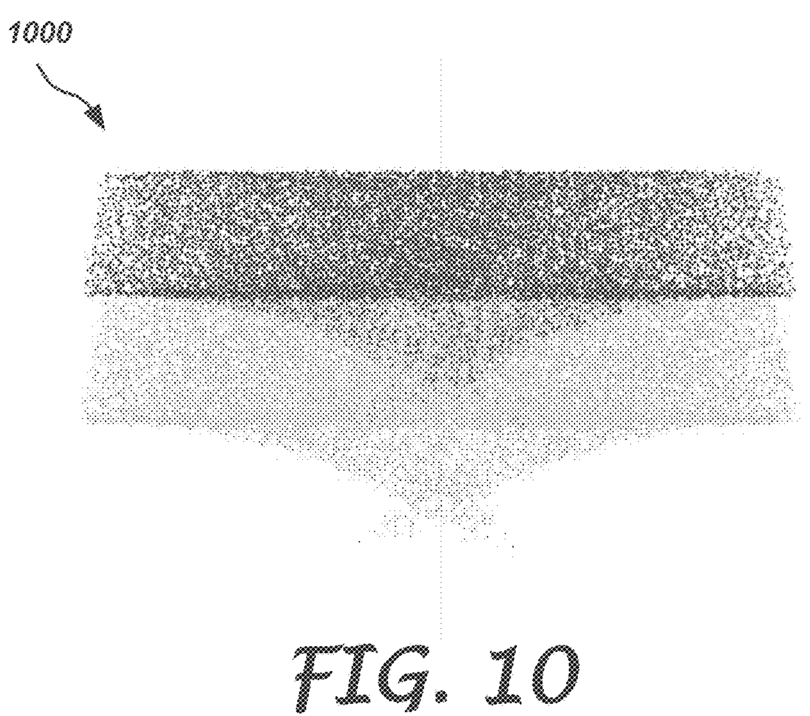
FIG. 10 is an image of a spot diagram for the spectrometer layout of FIG. 8, in accordance with this disclosure.

The spectrometer design of FIG. 9 supports this wavelength range with 0.025 nm resolution within a volume of approximately 6×6×8 inches. The resolution is achieved by combined selection of grating, mirrors, slit size, and sensor. For this specific wavelength range and resolution a grating with 2400 lines/mm may be used along with a sensor such as an S7031 CCD detector from Hamamatsu or other detectors with appropriate pixel size (~7-25 um) and array length (~1000-3000 pixels). For example the S11071 from Hamamatsu with a 2048×64 element pixel array and 14 um pixels may be used. FIG. 10 shows an image 1000 of a spot diagram for the spectrometer layout of FIG. 8, for a 5×100 um slit used to image two spectral lines separated by 0.025 nm about 386 nm.

FIG. 11 is a block diagram of an optical system 1100 including a spectrometer 1110 and specific related systems, in accordance with one embodiment of this disclosure. Spectrometer 1110 may incorporate the system, features, and methods disclosed herein to the advantage of measurement, characterization, analysis, and processing of optical signals from semiconductor processes and may be associated with spectrometer 160 of FIG. 1. Spectrometer 1110 may receive optical signals from external optics 1130, such as via fiber optic cable assemblies 157 or 159, and may, following integration and conversion, send data to external systems 1120, such as output 180 of FIG. 1, which may also be used to control spectrometer 1110 by, for example, selecting a mode of operation or controlling integration timing as defined herein. Spectrometer 1110 may include optical interface 1140 such as a subminiature assembly (SMA) or ferrule connector (FC) fiber optic connector or other opto-mechanical interface. The opto-mechanical interface controls the orientation of the fiber array relative to the input of the spectrometer so that the CCD read procedure may accurately isolate the respective channels. Further optical components 1145 such as slits, lenses, filters and gratings may act to form, guide and chromatically separate the received optical signals and direct them to sensor 1150 for integration and conversion. Filter 1146 denotes one of the filters. Filter 1146 can be a wide filter that corresponds to the operational wavelength range of the spectrometer 1110. Filter 1146 could also be a band pass filter, such as a narrow-band pass filter as referenced in in FIGS. 4, 5, and 8, which is used to select a portion of the operational wavelength range of the spectrometer 1110. As such, filter 1146 can be configurable based on the desired wavelength or wavelength range of interest. Configuring the bandpass filter can occur at manufacturing. Thus, the spectrometer 1110 can be a configurable optical solution with a small form factor for processing. The optical components 1145 can include optical components noted with respect to FIGS. 8-9, such as grating, mirrors, slit size, that are selected and combined to achieve a desired resolution. The optical components 1145 can be selectively combined to provide, for example, a wavelength range of approximately 380-410 nm with 0.025 nm resolution; all within a volume of the spectrometer 1100 defined by dimensions of approximately 6×6×8 inches. Selectively combining the optical components 1145 can also occur at manufacturing.

Filter 1131 represent another example of a narrow band filter such as a narrow-band pass filter as referenced in FIGS. 4, 5, and 8, that can be positioned external to the spectrometer 1110. As such filter 1131 can be adaptable in the field after manufacturing to select a particular portion of the operational wavelength range of the spectrometer 1110. When filter 1131 is present, filter 1146 can be a wide filter that corresponds to the operational wavelength range of the spectrometer 1110. In other words, a single narrow band pass filter can be used (e.g., 1131) with a wide band filter (e.g., 1146). A combination of band pass filters could also be used or interchanged for adaptability.

Low-level functions of sensor 1150 may be controlled by elements such as FPGA 1160 and processor 1170. Following optical to electrical conversion, analog signals may be directed to A/D convertor 1180 and converted from electrical analog signals to electrical digital signals which may then be stored in memory 1190 for immediate or later use and transmission, such as to external systems 1120 (c.f., signal processor 170 of FIG. 1). Although certain interfaces and relationships are indicated by arrows, not all interactions and control relations are indicated in FIG. 11. Spectral data shown in FIG. 3 may be, for example, collected, stored and/or acted upon within/by one or multiple of memory/storage 1190, FPGA 1160, processor 1170 and/or external systems 1120. Memory/storage 1190, FPGA 1160, processor 1170, and/or external systems 1120 provide examples wherein the processing capability, logic, and/or operating instructions corresponding to algorithms for processing optical signals as disclosed herein can be stored. Spectrometer 1110 also includes a power supply 1195, which can be a conventional AC or DC power supply typically included with spectrometers.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter. Configured means, for example, designed, constructed, or programmed, with the necessary logic, algorithms, processing instructions, and/or features for performing a task or tasks.

The changes described above, and others, may be made in the optical measurement systems and subsystems described herein without departing from the scope hereof. For example, although certain examples are described in association with semiconductor wafer processing equipment, it may be understood that the optical measurement systems described herein may be adapted to other types of processing equipment such as roll-to-roll thin film processing, solar cell fabrication or any application where high precision optical measurement may be required. Furthermore, although certain embodiments discussed herein describe the use of a common light analyzing device, such as an imaging spectrograph, it should be understood that multiple light analyzing devices with known relative sensitivity may be utilized. Furthermore, although the term "wafer" has been used herein when describing aspects of the current invention, it should be understood that other types of workpieces such as quartz plates, phase shift masks, LED substrates and other non-semiconductor processing related substrates and workpieces including solid, gaseous and liquid workpieces may be used.

The exemplary embodiments described herein were selected and described in order to best explain the principles of the invention and the practical application, and to enable others of ordinary skill in the art to understand the invention for various embodiments with various modifications as are suited to the particular use contemplated. The particular embodiments described herein are in no way intended to limit the scope of the present invention as it may be practiced in a variety of variations and environments without departing from the scope and intent of the invention. Thus, the present invention is not intended to be limited to the embodiment shown, but is to be accorded the widest scope consistent with the principles and features described herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Various aspects of the disclosure can be claimed including the apparatuses, systems, and methods disclosed herein. Aspects disclosed herein and noted in the Summary include:

A. A method of processing an optical signal that includes: (1) receiving an optical signal, (2) filtering the optical signal using a narrow pass band filter, and (3) processing the filtered optical signal using a selective combination of optical components based on a desired resolution.

B. An optical instrument that includes: (1) an optical interface that receives an optical fiber, (2) a narrow band pass filter that filters out a portion of an optical signal received via the optical fiber, (3) optical components that are selectively combined to process at least a portion of the unfiltered optical signal, wherein the optical components include a sensor that receives the unfiltered optical signal, and (4) one or more processors that process electrical signals from the sensor.

C. A semiconductor monitoring system that includes: (1) optical fiber and (2) a modified Czerny-Turner spectrometer having at least one narrow pass band filter that filters out a portion of an optical signal received via the optical fiber.

Each of aspects A, B, and C can have one or more of the following additional elements in combination: Element 1: wherein the optical components includes a combination of grating, mirrors, and slit size. Element 2: wherein the optical components include a sensor. Element 3: wherein the method is performed by a spectrometer having a small form factor. Element 4: wherein the spectrometer is a modified Czerny-Turner spectrometer. Element 5: wherein the desired resolution is selected based on processing emissions from one or more gas species. Element 6: wherein the one or more gas species include SiN, $SiF_2$, CH, CO and CN. Element 7: wherein a single one of the one or more species SiN, $SiF_2$, CH, CO and CN is selected for processing. Element 8: wherein the resolution is 0.025 nm. Element 9: wherein the combination of optical components is selected during manufacturing. Element 10: wherein the narrow pass band filter is adaptable after manufacturing. Element 11: wherein the optical components includes a combination of grating, mirrors, and slit size. Element 12: wherein the optical instrument is a spectrometer having a small form factor. Element 13: wherein the spectrometer is a modified Czerny-Turner spectrometer. Element 14: wherein the optical components are selectively combined to achieve a desired resolution based on processing emissions from one or more gas species. Element 15: wherein the one or more gas species include SiN, $SiF_2$, CH, CO and CN. Element 16: wherein a single one of the one or more species SiN, $SiF_2$, CH, CO and CN is selected for processing. Element 17: wherein the combination of optical components is selected during manufacturing of the optical instrument. Element 18: wherein the narrow pass band filter is adaptable after manufacturing of the optical instrument.

What is claimed is:

1. A method of spectroscopically processing an optical signal, comprising:

receiving an optical signal at a spectrometer;

filtering the optical signal using a narrow pass band filter to select a predetermined portion of an operational wavelength range of the spectrometer;

filtering the optical signal using a wide pass band filter that corresponds to the operational wavelength range of the spectrometer, wherein the wide pass band filter is fixed in a portion of a collimated light path within the spectrometer, wherein the collimated light path includes a collimating mirror, a grating, and a focusing mirror, and the wide pass band filter is fixed between the grating and either the collimating mirror or the focusing mirror to contribute to a desired resolution of the spectrometer by reducing optical background signals; and spectroscopically processing the filtered optical signal using a selective combination of optical components based on the desired resolution, wherein at least one of the narrow band pass filter and the wide band pass filter provide a spectral out-of-band rejection of optical density 6 or greater for the suppression of undesired optical signals.

2. The method as recited in claim 1, wherein the optical components include a combination of the grating, the collimating and focusing mirrors, and a slit size.

3. The method as recited in claim 1, wherein the optical components include a sensor.

4. The method as recited in claim 1, wherein the narrow pass band filter is positioned external to the spectrometer.

5. The method as recited in claim 1, wherein the spectrometer is a customized Czerny-Turner spectrometer.

6. The method as recited in claim 1, wherein the desired resolution is selected based on processing emissions from one or more gas species.

7. The method as recited in claim 6, wherein the one or more gas species include SiN, $SiF_2$, CH, CO and CN.

8. The method as recited in claim 7, wherein a single one of the one or more species SiN, $SiF_2$, CH, CO and CN is selected for processing.

9. The method as recited in claim 6, wherein the resolution is 0.025 nm.

10. The method as recited in claim 1, wherein the combination of optical components is selected during manufacturing.

11. The method as recited in claim 1, wherein the narrow pass band filter is adaptable after manufacturing to select a predetermined wavelength range corresponding to emissions from a predetermined species and the wide pass band filter is fixed at manufacturing.

12. An optical instrument for spectroscopically processing an optical signal, comprising:

an optical interface of a spectrometer that receives an optical fiber;

a narrow band pass filter that filters a portion of an optical signal corresponding to a predetermined portion of an operational wavelength range of the spectrometer received via the optical fiber;

a wide band pass filter fixed in a portion of a collimated light path within the spectrometer that filters the optical signal received via the optical fiber corresponding to the operational wavelength range of the spectrometer, wherein the collimated light path includes a collimating mirror, a grating, and a focusing mirror, and the wide pass band filter is fixed between the grating and either the collimating mirror or the focusing mirror to contribute to a desired resolution of the spectrometer by reducing optical background signals, wherein at least one of the narrow band pass filter and the wide band pass filter provide a spectral out-of-band rejection of optical density 6 or greater for the suppression of undesired optical signals;

optical components that are selectively combined to spectroscopically process at least a portion of the optical signal according to the desired resolution, wherein the optical components include a sensor that receives the optical signal; and one or more processors that process electrical signals from the sensor.

13. The optical instrument as recited in claim 12, wherein the optical components further include a combination of the grating, the collimating and focusing mirrors, and a slit size.

14. The optical instrument as recited in claim 12, wherein the narrow pass band filter is positioned external to the spectrometer.

15. The optical instrument as recited in claim 12, wherein the spectrometer is a customized Czerny-Turner spectrometer.

16. The optical instrument as recited in claim 12, wherein the optical components are selectively combined to achieve the desired resolution based on processing emissions from one or more gas species.

17. The optical instrument as recited in claim 16, wherein the one or more gas species include SiN, $SiF_2$, CH, CO and CN.

18. The method as recited in claim 17, wherein a single one of the one or more species SiN, $SiF_2$, CH, CO and CN is selected for processing.

19. The optical instrument as recited in claim 16, wherein the resolution is 0.025 nm.

20. The optical instrument as recited in claim 12, wherein the combination of optical components is selected during manufacturing of the optical instrument.

21. The optical instrument as recited in claim 12, wherein the narrow pass band filter is adaptable after manufacturing of the optical instrument to select a predetermined wavelength range corresponding to emissions from a predetermined species.

22. A semiconductor monitoring system, comprising:

optical fiber; and a customized Czerny-Turner spectrometer to spectroscopically process an optical signal, the spectrometer having at least one narrow pass band filter that filters out a portion of an optical signal received via the optical fiber and having at least one wide pass band filter that corresponds to an operational wavelength range of the spectrometer and is fixed in a portion of a collimated light path within the spectrometer, wherein the collimated light path includes a collimating mirror, a grating, and a focusing mirror, and the wide pass band filter is fixed between the grating and either the collimating mirror or the focusing mirror to contribute to a desired resolution of the spectrometer by reducing optical background signals, wherein at least one of the narrow band pass filter and the at least one wide band pass filter provide a spectral out-of-band rejection of optical density 6 or greater for the suppression of undesired optical signals.

* * * * *